United States Patent
Patterson et al.

(10) Patent No.: US 10,756,631 B2
(45) Date of Patent: Aug. 25, 2020

(54) INTEGRATED SOLUTION FOR MULTI-VOLTAGE GENERATION WITH THERMAL PROTECTION

(71) Applicant: MACOM Technology Solutions Holdings, Inc., Lowell, MA (US)

(72) Inventors: Andrew Patterson, Lisburn (GB); Brendan Foley, County Wexford (IE); Michelle Dowling, County Cork (IE); Chi Mo, Irvine, CA (US)

(73) Assignee: MACOM TECHNOLOGY SOLUTIONS HOLDINGS, INC., Lowell, MA (US)

( * ) Notice: Subject to any disclaimer, the term of this patent is extended or adjusted under 35 U.S.C. 154(b) by 0 days.

(21) Appl. No.: 16/355,463

(22) Filed: Mar. 15, 2019

(65) Prior Publication Data

US 2020/0021195 A1 Jan. 16, 2020

Related U.S. Application Data

(63) Continuation of application No. 15/619,236, filed on Jun. 9, 2017, now abandoned.

(51) Int. Cl.
*H02M 3/158* (2006.01)
*H02M 3/155* (2006.01)
*H02M 1/00* (2006.01)
*H02M 1/32* (2007.01)

(52) U.S. Cl.
CPC ......... *H02M 3/1588* (2013.01); *H02M 3/155* (2013.01); *H02M 3/158* (2013.01); *H02M 2001/009* (2013.01); *H02M 2001/0045* (2013.01); *H02M 2001/327* (2013.01)

(58) Field of Classification Search
CPC .......................................... H02M 3/155–1588
See application file for complete search history.

(56) References Cited

U.S. PATENT DOCUMENTS

| | | |
|---|---|---|
| 5,367,268 A | 11/1994 | Baba |
| 5,892,400 A | 4/1999 | van Saders et al. |
| 6,424,232 B1 | 7/2002 | Mavretic et al. |
| 6,972,628 B2 | 12/2005 | Eo et al. |
| 7,109,801 B2 | 9/2006 | Li |
| 7,746,156 B1 | 6/2010 | Massie et al. |
| 8,026,636 B2 | 9/2011 | Oh |
| 10,110,218 B2 | 10/2018 | Foley et al. |
| 10,560,062 B2 | 2/2020 | Foley et al. |
| 2003/0015767 A1 | 1/2003 | Emrick et al. |
| 2003/0102912 A1 | 6/2003 | Tripathi et al. |
| 2005/0213354 A1 | 9/2005 | Pai |

(Continued)

OTHER PUBLICATIONS

International Search Report and Written Opinion for Application No. PCT/US2017/048621 dated Nov. 30, 2017.

(Continued)

*Primary Examiner* — Daniel Kessie
*Assistant Examiner* — Peter M Novak
(74) *Attorney, Agent, or Firm* — Thomas | Horstemeyer, LLP

(57) ABSTRACT

A multi-voltage converter is described that includes integrated temperature-protection circuitry. The converter may be used to bias radio-frequency components such as PIN diodes and gallium-nitride devices, and may include integrated bias-sequencing circuitry. Programmable output voltages as high as 30 volts and as low as −20 volts may be generated.

16 Claims, 5 Drawing Sheets

(56) References Cited

U.S. PATENT DOCUMENTS

| | | |
|---|---|---|
| 2007/0004343 A1 | 1/2007 | Kandola et al. |
| 2008/0180176 A1 | 7/2008 | Lee |
| 2009/0108794 A1 | 4/2009 | Ochiai et al. |
| 2010/0073088 A1 | 3/2010 | Wimpenny et al. |
| 2011/0006846 A1 | 1/2011 | Miho et al. |
| 2011/0050036 A1 | 3/2011 | Gilardi |
| 2011/0181324 A1 | 7/2011 | Gesche et al. |
| 2011/0279185 A1 | 11/2011 | Lautzenhiser |
| 2013/0121044 A1 | 5/2013 | Gao et al. |
| 2013/0207726 A1 | 8/2013 | Tadano |
| 2014/0184334 A1 | 7/2014 | Nobbe et al. |
| 2015/0188496 A1 | 7/2015 | Kim |
| 2016/0134967 A1 | 5/2016 | Kwon |
| 2018/0061984 A1 | 3/2018 | Achiriloaie et al. |
| 2018/0145680 A1 | 5/2018 | Foley et al. |
| 2018/0145681 A1 | 5/2018 | Foley et al. |
| 2018/0145682 A1 | 5/2018 | Foley et al. |
| 2018/0358886 A1 | 12/2018 | Patterson et al. |
| 2019/0245085 A1 | 8/2019 | Achiriloaie et al. |

OTHER PUBLICATIONS

Written Opinion of the International Preliminary Examining Authority for International Application No. PCT/US2017/048621, dated Aug. 6, 2018.

Written Opinion of the International Preliminary Examining Authority for International Application No. PCT/US2017/048621, dated Nov. 14, 2018.

Ch. II International Preliminary Report on Patentability for International Application No. PCT/US2017/048621, dated Dec. 19, 2018.

[No Author Listed] M09000-14: LED Driver and PMIC for DLP/LCOS Pico Projectors. MACOM Technology Solutions, Inc. Publicly known prior to Nov. 18, 2016. 56 pages.

[No Author Listed] TPS6513x Positive and Negative Output DC-DC Converter. Texas Instruments. Jan. 2016. 33 pages.

U.S. Appl. No. 16/182,458, filed Nov. 6, 2018, Achiriloaie et al.

PCT/US2017/048621, Aug. 6, 2018, Written Opinion of the International Preliminary Examining Authority.

PCT/US2017/048621, Nov. 14, 2018, Written Opinion of the International Preliminary Examining Authority.

PCT/US2017/048621, Dec. 19, 2018, Ch. II International Preliminary Report on Patentability.

INTEGRATED SOLUTION FOR MULTI-VOLTAGE GENERATION WITH THERMAL PROTECTION

CROSS REFERENCE OF RELATED APPLICATIONS

This Application is a Continuation of U.S. application Ser. No. 15/619,236, filed Jun. 9, 2017. The entire contents of this application is incorporated herein by reference in its entirety.

BACKGROUND

Technical Field

The technology relates to an integrated multi-voltage converter with thermal protection that may be used for biasing radio-frequency components, such as gallium-nitride devices and PIN diodes.

Discussion of the Related Art

Radio-frequency (RF) applications, such as wireless communications and radar, often involve the use of electronic components that require one or more bias voltage values that differ from voltages used for supplying conventional logic circuits. Examples of such electronic components include "PIN" diodes and gallium-nitride devices. PIN diodes are semiconductor diodes with wide, intrinsic semiconductor regions between p-type and n-type semiconductor regions on either side of the diode junction. PIN diodes can be used in radio-frequency (RF) applications as switches and/or attenuators, and may be used in some applications as photodetectors and photovoltaic cells. When a PIN diode is forward biased, the PIN diode becomes conductive and can readily pass an RF signal. Under forward bias, the PIN diode essentially appears as a short. When at zero bias or reverse bias, a PIN diode is mainly a capacitive element, since the intrinsic region of the diode is depleted of carriers, and may effectively block an RF signal. For improved isolation, high reverse-bias voltages (10 volts or more) may be used. The capacitance of a PIN diode can be small (e.g., on the order of 1 pF or less). Because a PIN diode has small capacitance, it can be switched at high speed between conductive and capacitive states which makes it attractive for RF applications.

Gallium-nitride (GaN) devices may include GaN transistors, such as high-electron mobility transistors (HEMTs), formed from gallium-nitride material and configured in an amplifier circuit. These amplifiers are useful for RF communications and radar applications because of their high-speed and high-breakdown-voltage capabilities. Gallium-nitride transistors may be biased at their gate with negative voltages as high as −20 volts in some cases (e.g., to prevent unwanted conduction) and also supplied at their drain with high positive voltages.

SUMMARY

Circuits and methods for an integrated multi-voltage converter with thermal protection are described. The converter may be useful for biasing RF components, such as PIN diodes and GaN devices that may be used in power amplification for communication or radar systems. According to some embodiments, a multi-voltage converter may use only a single low-voltage supply (e.g., a 5-volt supply) and provide multiple, programmable voltage outputs as high as 35 volts and as low as −20 volts and driving currents up to 80 mA. As such, the converter may directly drive circuitry for PIN diodes and/or GaN devices in communications applications, for example, using only a single low-voltage supply. A multi-voltage converter may include an integrated temperature sensor and temperature control circuitry that protects the converter from over-heat or over-current conditions.

Some embodiments relate to a voltage converter comprising a substrate on which the voltage converter is assembled, a supply voltage contact configured to receive electrical power from a power source having a positive voltage, a boost converter connected to the supply voltage contact and configured to convert a supply voltage received from the power source to a first voltage that is greater than the supply voltage and to a negative voltage, and temperature sensing and control circuitry configured to sense an over-heat condition of the voltage converter.

In some aspects, the supply voltage contact is the only contact for receiving power that powers the voltage converter. The supply voltage may be between approximately 2.5 volts and approximately 7 volts.

In some implementations, the temperature sensing circuitry comprises a temperature sensor located near switching transistors of the boost converter. The temperature control circuitry may comprise a comparator and at least one logic gate and is configured to receive a signal from the temperature sensing circuitry and output a control signal that alters operation of the boost converter when an over-heat condition is sensed. According to some implementations, the control signal causes termination of voltage conversion by the boost converter when an over-heat condition is sensed. In some cases, the control signal causes a reduction of a value of a converted output voltage from the voltage converter when an over-heat condition is sensed.

In some aspects, a voltage converter may further comprise a low-dropout regulator configured to convert the first voltage to a second voltage that is less than the first voltage, and a register configured to output a first control signal that sets at least the second voltage within a positive voltage range that is greater than zero volts. In some implementations, a voltage converter may further comprise a sequencing circuit assembled on the substrate and configured to apply the second voltage to a drain supply contact only when the negative voltage is provided to a gate contact. The sequencing circuit may comprise a first logic circuit that senses a voltage at the gate contact and controls application of the second voltage to the drain supply contact, and a second logic circuit that senses a voltage at the drain supply contact and controls application of the negative voltage to the gate contact.

According to some implementations, the boost converter is configured to output up to 80 mA for the second voltage and/or the negative voltage. A voltage converter may further comprise a bias driver configured to receive a bias voltage from the low-dropout regulator and switch an output bias voltage between two levels. A voltage converter may be arranged in a circuit to apply the second voltage and the negative voltage to a radio-frequency component. In some implementations, the radio-frequency component comprises a gallium-nitride transistor.

In some aspects, the negative voltage has a value in a range from approximately −8 volts to approximately −20 volts. The first voltage may have a value in a range from approximately 20 volts to approximately 35 volts.

According to some implementations of a voltage converter, the boost converter comprises two transistors, two inductor contacts on the substrate that are connected to the two transistors, and switching circuitry configured to switch current through an inductor that attaches to the two inductor contacts.

Some embodiments relate to methods for biasing radio-frequency components with a multi-voltage converter. A method may comprise acts of receiving, at the multi-voltage converter assembled on a substrate, a supply voltage, converting, with a boost converter assembled on the substrate, the supply voltage to a first voltage that is positive and greater than the supply voltage, converting, with the boost converter, the supply voltage to a negative voltage that is less than the first voltage, reducing, with a low-dropout regulator assembled on the substrate, the first voltage to a second voltage, providing the second voltage and/or the negative voltage to bias a radio-frequency component, sensing a temperature of the multi-voltage converter with an integrated temperature sensor, determining an over-heat condition, and altering, with a temperature-control circuit, operation of the boost converter in response to determining the over-heat condition. The supply voltage may be the only supply voltage received by the voltage converter.

In some aspects, a current between about 45 mA and about 80 mA is provided for the second voltage. The supply voltage may be between approximately 2.5 volts and approximately 7 volts and the first voltage is between approximately 20 volts and approximately 35 volts. The negative voltage may be between approximately −8 volts and approximately −20 volts.

In some aspects, the sensing may comprise comparing a signal received from the integrated temperature sensor with a reference signal. In some cases, the sensing comprises sensing a temperature near switching transistors of the boost converter.

In some implementations, the altering may comprise receiving, at a logic circuit of the boost converter, a control signal from the temperature-control circuit, and disabling voltage conversion by the boost converter in response to receiving the control signal. In some cases, the altering may comprise receiving, at a programmable register assembled on the substrate, a control signal from the temperature-control circuit, and providing, in response to receiving the control signal, a signal from the programmable register that alters the second voltage from a first value to a second value within a positive voltage range that is greater than zero volts.

According to some aspects, the providing may comprise sensing, with a sequencing circuit integrated on the substrate, a first voltage value at a gate contact for the radio-frequency component, and switching, with the sequencing circuit, the second voltage to a drain supply contact for the radio-frequency component only when the first voltage value is a negative voltage less than a threshold amount. Further acts may include sensing, with the sequencing circuit, a second voltage value at the drain supply contact, and removing, with the sequencing circuit, a negative voltage from the gate contact only when the second voltage value is below a threshold value.

In some aspects, converting the supply voltage to the first voltage and converting the supply voltage to the negative voltage comprises switching two transistors to drive current through a single inductor. The switching may comprise a combination of pulse width modulation and pulse frequency modulation.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the embodiments may be shown exaggerated or enlarged to facilitate an understanding of the embodiments. The drawings are not necessarily to scale, emphasis instead being placed upon illustrating the principles of the teachings. In the drawings, like reference characters generally refer to like features, functionally similar and/or structurally similar elements throughout the various figures. Where the drawings relate to microfabricated circuits, only one device and/or circuit may be shown to simplify the drawings. In practice, a large number of devices or circuits may be fabricated in parallel across a large area of a substrate or entire substrate, for example. Additionally, a depicted device or circuit may be integrated within a larger circuit.

When referring to the drawings in the following detailed description, spatial references "top," "bottom," "upper," "lower," "vertical," "horizontal," "above," "below" and the like may be used. Such references are used for teaching purposes, and are not intended as absolute references for embodied devices. An embodied device may be oriented spatially in any suitable manner that may be different from the orientations shown in the drawings. The drawings are not intended to limit the scope of the present teachings in any way.

Figure 1:
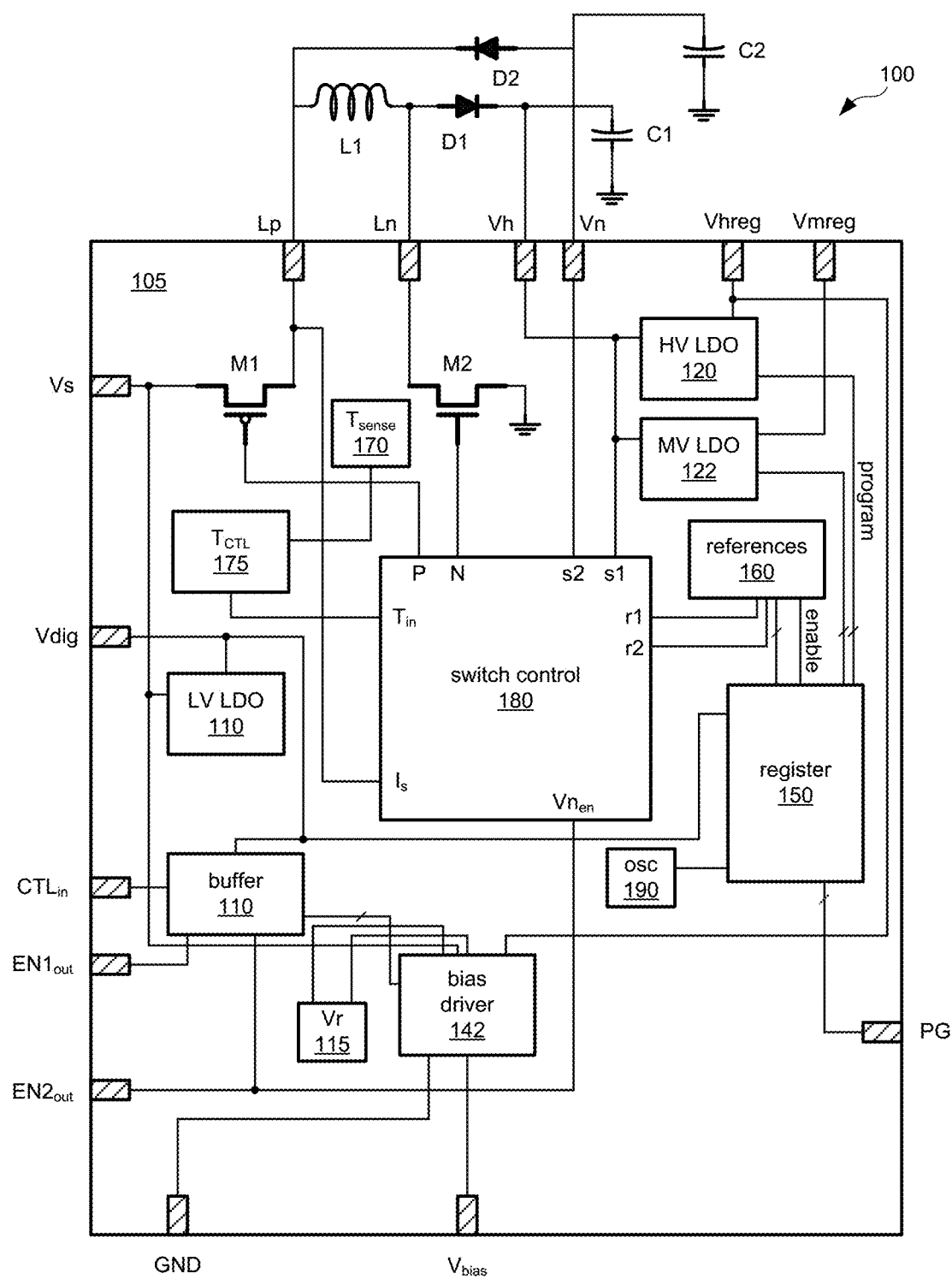
FIG. 1 depicts an integrated multi-voltage converter with thermal protection which may be powered by a single, low-voltage supply, according to some embodiments.

Features and advantages of the illustrated embodiments will become more apparent from the detailed description set forth below when taken in conjunction with the drawings.

DETAILED DESCRIPTION

Microwave and radio frequency (RF) systems, such as mobile phone and radar systems, can include circuit components requiring a number of different bias voltage levels. For example, mobile communication systems may include digital logic circuitry for signal processing and also include analog circuitry for transmitting and receiving RF signals. The digital logic circuitry may require a first set of supply voltages (e.g., one or more of 1.8 volts, 3.3 volts, and 5 volts). In some cases, the analog circuitry may require large negative voltage values as well as large positive voltage values for switching RF signals (such as in time-division duplex (TDD) communication systems) and for signal amplification (e.g., to transmit signals wirelessly over large distances).

One way to switch RF signals is to use PIN diodes in a branching circuit and bias the PIN diodes appropriately to either pass or block RF transmission on each branch. The inventors have recognized and appreciated that bias voltages required for such PIN diode switches (typically 15 volts or more, and in some cases −15 volts or less) is appreciably more than voltages needed for other electronic components (e.g., buffers, logic chips, ASICs, analog-to-digital and digital-to-analog converters, processors, etc.) of signal processing circuitry in mobile phones and RF systems. This difference in required voltage can present an inconvenience for manufacturers. For example, an additional voltage supply, or supplies, may be needed in the system to operate the PIN diodes. It is typically the responsibility of the manufacturer to provide the additional voltage supply or supplies needed for the PIN diodes and driving circuits.

Although GaN devices have emerged as desirable components for RF communication systems and radar applications, they can require multiple voltage supplies and require careful biasing techniques to avoid damaging the devices. For example, it may be necessary upon power-up of a gallium-nitride HEMT to reverse bias a gate of the device with a high negative voltage prior to and while applying a positive supply voltage to a drain of the transistor. The negative bias can prevent an otherwise large current flow that would occur and that could damage the HEMT if the supply voltage alone were applied to the HEMT. In some cases, the negative voltage bias can be as large as −8 volts or more, and the positive voltage bias can be as large as 20 volts or more.

In addition to the large voltages of opposite polarity required in RF and radar applications, sufficient current driving capability may also be needed. For example, PIN diode switches and/or GaN amplifiers may require supply or bias currents between about 45 mA and about 80 mA to achieve fast switching speeds and/or large gain values necessary for RF communications. In some cases, the large currents and average power requirements can lead to heat generation and the need to dissipate the heat.

To avoid the inconvenience of additional power supplies, the inventors have conceived of a multi-voltage converter that includes a DC-DC boost converter with multiple output voltages, at least some of which are regulated by low dropout regulators (LDOs). The converted output voltages may be capable of providing up to about 80 mA of drive current. In some embodiments, a negative voltage and a positive voltage output from the boost converter may be used to bias GaN devices, such as GaN transistors and/or GaN amplifiers. According to some embodiments, the multi-voltage converter can be assembled on a same substrate in a single module that is powered by a single, low-voltage source (e.g., a 5-volt source). The inventors have also recognized and appreciated that the requirements of high voltage and high current can lead to substantial heating of an integrated circuit on which the multi-voltage converter is formed, and heating may increase if GaN devices and/or PIN diodes are incorporated into the same package. To protect the device from over-heat conditions, a temperature sensor and temperature-control circuitry may be integrated within the same package.

The multi-voltage converter may have additional features. In some implementations, voltage levels of the output voltages may be externally and dynamically programmable, so that the output voltages can be tuned to improve performance of components biased by the multi-voltage converter. Additional components, such as bias drivers and TTL buffers, may be assembled on the same substrate and powered by the same low-voltage source.

FIG. 1 shows one example of multi-voltage converter 100 with integrated thermal protection for biasing RF and microwave devices. Most of the components for the multi-voltage converter, except for a few external passive components (e.g., inductors, capacitors, diodes, resistors), may be incorporated in a single module in some embodiments. The components may be assembled onto a substrate 105 and incorporated into a ceramic or plastic package having multiple contacts on an external surface. The contacts (e.g., pins, tabs, bumps, or pads) may be designed for making separate connections to the multi-voltage converter within a larger circuit or system (e.g., inserting into a printed circuit board and/or connecting with solder). The substrate 105 may be any suitable insulating substrate (e.g., formed from printed circuit board material, plastic, or a ceramic) and may include a ground plane or ground conductors.

In overview, the multi-voltage converter 100 may include a supply voltage contact (labeled "Vs" in the drawing) to which power may be applied to activate the converter and other components integrated on the substrate. In some embodiments, the multi-voltage converter may be powered with a single source (not shown) that outputs a voltage $V_s$ between about 2.5 volts and about 7 volts and is capable of providing between about 80 milliamps and about 1 amp. In some embodiments, the supply voltage contact Vs may connect to a DC-DC boost converter that converts the received low voltage $V_s$ to a first high voltage $V_h$ (e.g., between about 20 volts and about 35 volts) that is provided to a high-voltage contact Vh. The boost converter may additionally convert the received low voltage to a negative voltage $V_n$, e.g., between about −8 volts and about −20 volts, that is provided to a negative-voltage contact Vn.

The high-voltage $V_h$ output from the voltage converter may be provided to a high-voltage, low-dropout regulator (HV LDO) 120, according to some embodiments, which regulates the high voltage down to a second high-voltage value $Vh_{reg}$. The regulated voltage may be a value between about 15 volts and about 28 volts. The high-voltage $V_h$ output from the voltage converter may also be provided to a mid-voltage, low-dropout regulator (MV LDO) 122, according to some embodiments, which regulates the high voltage down to a mid-voltage value $Vm_{reg}$. The regulated mid-voltage may be a value between about 8 volts and about 11 volts. In some implementations, the negative voltage $V_n$ may be provided to a negative voltage LDO (not shown) and regulated to reduce any spurs on the negative voltage output.

In some implementations, the regulated voltage from the HV LDO 120 (or any of the other two output voltages) may be provided to a bias driver 142, which may be controlled by signals from a transistor-transistor logic (TTL) buffer 110. In some implementations, the bias driver may be controlled to apply a regulated bias voltage to one or more PIN diodes for switching RF signals and/or to one or more GaN devices for amplifying an RF signal. In some embodiments, there may be additional bias drivers used to control a same output voltage or different output voltages.

In further detail, a multi-voltage converter 100 may comprise a DC-DC boost converter that uses a single inductor L1 and provides multiple output voltages, though other types of voltage converters may be used in other embodiments. The inductor may mount external to the package and connect to inductor contacts Lp and Ln. The boost converter may comprise two or more transistors within the package that are configured to switch current from the supply voltage contact Vs through the inductor L1. In some embodiments, there may be two transistors M1, M2 of opposite type (p-FET, n-FET) connected to switch current through the inductor L1. The transistors may be sized to switch up to 2 amps of current through the inductor, and have breakdown voltages as high as 100 volts or more. In other embodiments, the transistors may be rated for less current and lower voltage.

The switching of the transistors M1, M2 may be controlled by a switch control circuit 180. In some implementations, the switch control 180 may comprise circuitry used for single-inductor multiple output (SIMO) converters. The switch control 180 may include two output contacts (P, N) that connect to gates of the transistors M1, M2, and also include a current-sensing contact $I_s$ that connects to a source or drain of one of the transistors M1, couples to an end of the inductor L1, and connects to current limiting circuitry with the switch control 180. In some implementations, the switch control 180 may include a negative-voltage enable output contact $Vn_{en}$ which provides a signal that indicates whether the negative voltage $V_n$ generated by the boost converter has reached or crossed a predetermined voltage level.

To protect against over-heat conditions, a temperature sensor 170 and temperature control circuit 175 may be integrated on the same substrate 105 and configured to sense an over-heat condition of the voltage converter. The temperature sensor may be integrated on the substrate near (e.g., within 2 mm) of the switching transistors M1, M2 in some embodiments, so that it can better sense the higher temperature near these devices. In other embodiments, the temperature sensor may be located farther from the transistors than 2 mm. In some cases, the temperature sensor may be located near one or more bias drivers 142, PIN diodes (not shown), or GaN devices (not shown) integrated on the substrate 105. In some implementations, there may be more than one temperature sensor integrated on the substrate 105. The temperature sensor 170 may comprise a thermistor element, in some embodiments, or may comprise a band-gap reference temperature-sensing circuit or any other suitable temperature-sensing circuit that outputs a signal indicative of temperature. In some implementations, the temperature control circuit 175 may comprise a voltage comparator and logic elements, as described below in connection with FIG. 4.

Additional components for voltage conversion may include two diodes D1, D2 and two charging capacitors C1, C2, which may be mounted external to the package and connect to the boost-converter circuitry within the package via a high-voltage contact Vh and a negative-voltage contact Vn, as indicated in FIG. 1. The diodes may also connect to the external inductor L1. These diodes and capacitors may be sized to handle up to 2 amps of current flow that is switched through the inductor L1, and may have high breakdown voltages (e.g., 100 volts or more). By choosing transistors M1, M2, diodes D1, D2, and capacitors C1, C2 to handle large current flows through the inductor L1 and to sustain high voltages (which can be due to voltage spikes resulting from transistor switching) and by using a voltage-conversion scheme that implements both pulse-width and pulse-frequency modulation, the multi-voltage converter may output driving currents up to 80 mA at positive and negative output voltage levels described above.

In some implementations, the multi-voltage converter may output driving currents between about 45 mA and about 80 mA. The capability of outputting drive currents in this range allows the multi-voltage converter to directly power RF amplifiers that can be used in mobile communication systems (e.g., amplifiers used in cell phones and portable computing devices). It also allows the multi-voltage converter to directly bias PIN diodes at high switching speeds used in mobile communication systems.

The high-voltage contact Vh may be configured to connect to a node between a cathode of the first diode D1 and the first capacitor C1, and may also connect to a high-voltage sensing node s1 of the switch control 180. The negative-voltage contact Vn may be configured to connect to a node between an anode of the second diode D2 and the second capacitor C2, and may further connect to a negative-voltage sensing node s2 of the switch control 180. Circuitry within the switch control 180 may monitor the voltages on the capacitors C1, C2 as they are charged and discharged by the switching of transistors M1, M2, and control switch timing based in part on the detected voltages. One or more contacts r1, r2 may be included with the switch control 180 to receive programmable reference voltage values that can be compared against sensed voltage values, and used to maintain output voltages from the voltage converter at desired levels and/or alter the output voltages to desired levels.

According to some embodiments, reference voltage values for the switch control 180 may be provided by programmable reference circuitry 160. Any suitable voltage reference circuit may be used to provide one or more DC voltage reference values. In some implementations, digital-to-analog converters (DACs) may be included to obtain reference voltage values, where a digital code is applied to obtain a desired analog output reference voltage. Other examples of voltage reference circuits include Zener diode voltage reference circuits, resistive voltage dividers, and programmable bandgap voltage references. According to some embodiments, voltage reference circuits in the reference circuitry 160 may be programmed and/or activated by voltage-programming signals that are transmitted from a register 150. The register may be included in the same package and assembled on the same substrate 105 as the boost converter. Voltage-programming signals may be transmitted upon start-up and/or while the multi-voltage converter is in operation. In some embodiments, voltage reference circuits in the reference circuitry 160 may be programmed directly via external data signals that are provided to the reference circuitry 160.

In some embodiments, multi-voltage converter 100 may include a programmable HV LDO 120 and/or a programmable MV LDO 122 that receive the converted high voltage $V_h$ (e.g., voltage appearing at C1) of the boost converter. Some embodiments may include a negative voltage LDO that receives the converted negative voltage $V_n$. According to some implementations, an LDO may be programmed by providing a programmable reference voltage, used by the LDO, from the register 150. The inventors have recognized and appreciated that the converted high voltage $V_h$ has spikes that result from the switching of transistors M1, M2. These spikes, if passed to the bias driver 142 or external RF components may couple onto and add noise to RF signals that are switched by PIN diodes or amplified by GaN amplifiers, for example. This noise generated by switching of the transistors M1, M2 can degrade RF communication signals.

To reduce the switching noise, the boost voltage converter may convert the input voltage $V_s$ to a voltage greater than necessary. The LDOs may then substantially remove the spikes and provide a regulated voltage at lower, desired voltage levels that are suitable for biasing RF components. According to one embodiment, the boost voltage converter may boost the input supply voltage $V_s$ from a value between about 2.5 volts and about 7 volts, to about 24 volts, and the HV LDO 120 may regulate the voltage to about 19.5 volts while substantially removing switching noise from the boost converter. Other voltage values may be used in other embodiments.

According to some implementations, the LDOs may be programmed with digital data received from the register 150, while in other embodiments the LDOs may be programmed with signals received from reference circuitry 160. In some embodiments, the HV LDO may include a DAC that converts the digital signal to an analog signal for use as a reference voltage. In some cases, the reference circuitry 160 may output a programmed analog voltage value instead of a digital signal to the LDOs 120, 122 to use as reference voltages. An on-board oscillator 190 may be assembled on the substrate 105 (or a clock signal may be received from an external source) and used to clock data to and from the register 150 upon start-up and during operation.

In the drawings, interconnects having a slash indicate digital data lines having more than one bit per digital word and/or more than one data line carrying digital data in parallel, according to some embodiments. Other embodiments may use analog lines instead of digital lines and vice versa, wherein analog-to-digital and digital-to-analog conversion may be used on the links.

According to some embodiments, the register 150 may be configured on-the-fly, prior to, or at start-up of the multi-voltage converter 100 via a programming contact PG. For example, digital data may be provided to the register 150 via the programming contact to alter voltage reference values provided to the LDOs 120, 122 and/or provided by reference circuits 160. In this manner, voltages $V_h$, $V_n$, $Vh_{reg}$, and $Vm_{reg}$ may be programmed to desired non-zero values for a particular application. For example, a first set of voltages may be used for a PIN diode switching application, and a second set of voltages may be used for biasing a GaN amplifier. In some implementations, $V_h$ may be programmed to any value between about 20 volts and about 35 volts, $Vh_{reg}$ may be programmed to any value between about 15 volts and about 28 volts, $Vm_{reg}$ may be programmed to any value between about 8 volts and about 11 volts, and $V_n$ may be programmed to any value between about −8 volts and about −20 volts.

In some embodiments, the register 150 may be hard-wired with values for reference voltages. For example, if the multi-voltage converter is intended to be used only for a particular application (such as biasing PIN diode switches), then the register may be hard-wired at manufacture for that application. This would eliminate the need for a customer to program the register for the desired application.

In some implementations, output voltages $V_h$, $V_n$, $Vh_{reg}$, and/or $Vm_{reg}$ may be adjusted on-the-fly to obtain better performance of a biased component. For example, a PIN diode switch may provide higher RF isolation between two ports with higher reverse-bias voltages on a diode, so voltages may be increased when high isolation is needed. However, higher output voltages from the converter may cause the boost converter to operate less efficiently. When high RF isolation is not needed, voltages may be decreased to improve voltage conversion efficiency and reduce power consumption.

In some implementations, on-board logic and digital components may operate at supply voltages lower than the supply voltage $V_s$ provided to the voltage supply contact Vs. For example, the provided supply voltage $V_s$ may be about 5 volts, and the on-board digital logic circuitry may operate at 3.3 volts or as low as 1.8 volts. According to some embodiments, a low-voltage (LV) LDO 110 may be included with the multi-voltage converter 100 on the substrate 105 and within the same package. The LV LDO 110 may receive the same supply voltage $V_s$ used for powering the multi-voltage converter 100, and output a lower voltage for digital logic. The output voltage from the LV LDO may be provided to an external contact Vdig for external use and/or monitoring.

In some applications, it may be desirable to activate an external RF component only at certain times. For example, RF TDD transceiver circuitry may include a low-noise amplifier that only needs to be active when RF signals are being received, and that can be deactivated when RF signals are being transmitted. To reduce energy consumption and/or avoid amplifier damage, the low-noise amplifier may be deactivated for a period of time when signal amplification is not needed, and receive an activation or enable signal from the TTL buffer 110 when needed. According to some embodiments, the TTL buffer is configured to produce an enable signal (e.g., a logic hi or lo signal) at an enable contact $EN1_{out}$ that indicates the bias driver is activated (e.g., PIN diodes have been biased to switch a TDD system to a receive mode). External detection of the enable signal may then cause activation of a low-noise amplifier in the receive signal path. In some implementations, an enable signal at the enable contact $EN1_{out}$ may be used for other purposes in controlling RF components that are used in combination with the multi-voltage converter 100.

Figure 2:
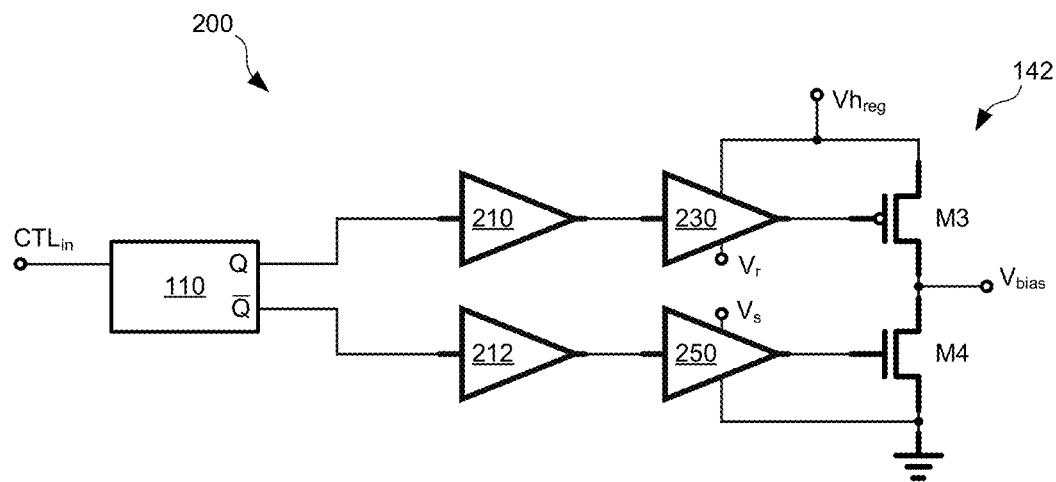
FIG. 2 depicts components of a bias driver, according to some embodiments.

FIG. 2 schematically depicts components of a bias driver 142, according to some embodiments. In this example, the bias driver is arranged to switch an output bias voltage $V_{bias}$ between two levels, approximately $Vh_{reg}$ and approximately ground potential. Alternative bias driver circuits may be used for other implementations, and may be configured to switch the output bias voltage between other voltage levels (e.g., levels that may include $Vm_{reg}$ and Vn). According to some embodiments, a bias driver may comprise a pair of level shifters 210, 212 configured to receive enable or not-enable signals from the TTL buffer 110. One branch of a bias driver may control a first transistor M3 via a first buffer 230, and a second branch of the bias driver may control a second transistor M4 via a second buffer 250. The second transistor M4 may be of opposite conductivity type than that of the first transistor M3.

In some implementations, the buffers 230, 250 may be low-voltage buffers of the same type (e.g., 5-volt buffers). However, the supply and reference voltages for each buffer may differ. For example, the first buffer 230 may be configured to drive a p-type transistor M3 that switches the high voltage $Vh_{reg}$ onto and off the biasing node $V_{bias}$. Accordingly, its supply voltage may be $Vh_{reg}$ and its reference voltage $V_r$ may be about 5 volts (or the buffer's rated voltage) below $Vh_{reg}$. The reference voltage $V_r$ may be provided by a suitable voltage reference circuit 115, referring again to FIG. 1. In some cases, the reference voltage $V_r$ and its circuit may be included in reference circuitry 160. A level shifter 210 may shift the voltage level from TTL buffer 110 to a higher value that is suitable for operating the first buffer 230.

The second buffer 250 may be configured to drive an n-type transistor M4 that switches the biasing node to a low voltage or ground potential. The second buffer 250 may receive the supply voltage $V_s$ used for powering the multi-voltage converter 100 and receive a reference voltage at ground potential, for example.

Figure 3:
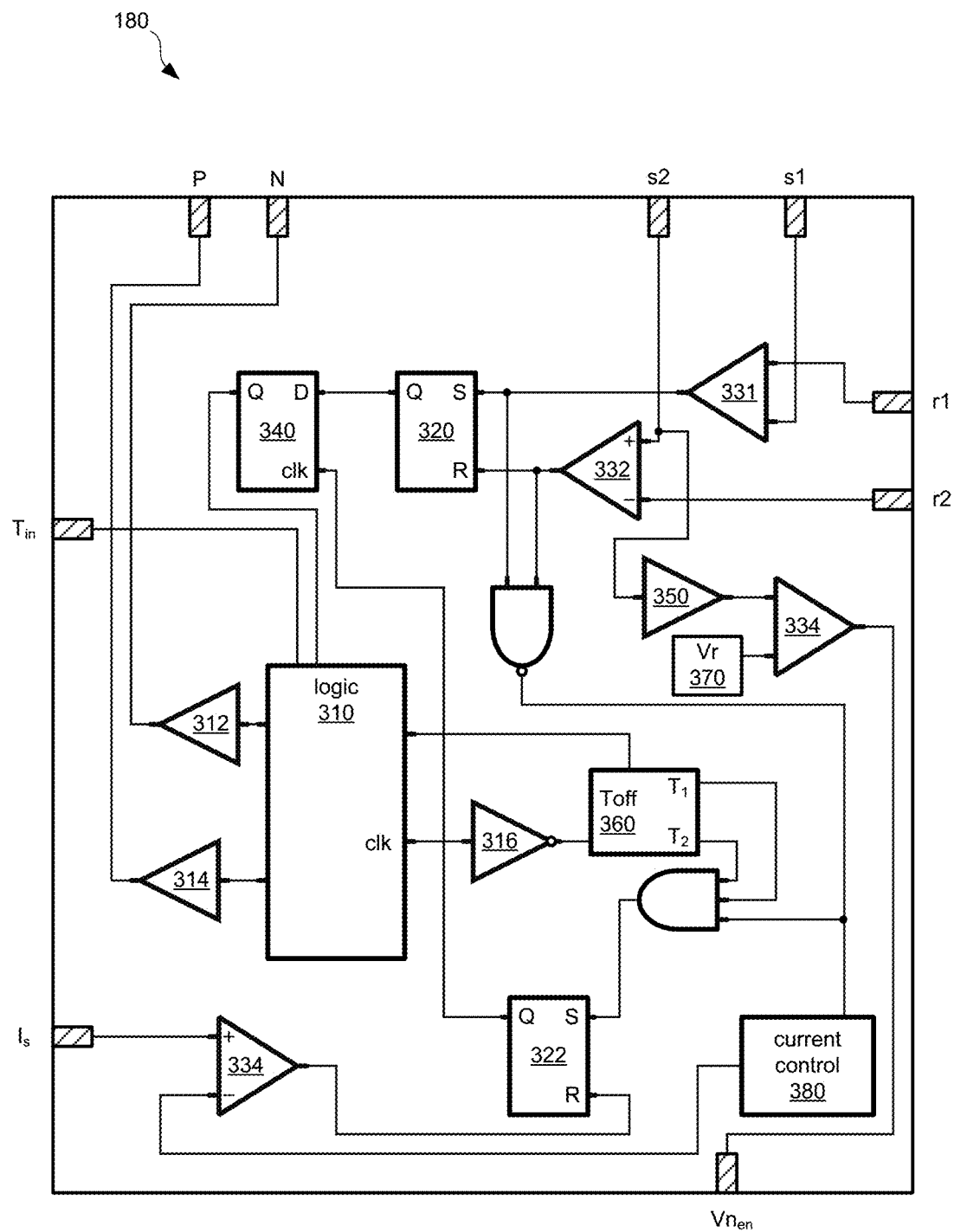
FIG. 3 depicts components of a switch control circuit for a single-inductor boost converter, according to some embodiments.

Some components that may be included in some embodiments of the switch control 180 are depicted in FIG. 3. In some implementations, the switch control 180 may utilize current-limit control and combine aspects of pulse width modulation (PWM) and pulse frequency modulation (PFM) to determine when to operate the transistors M1, M2 to drive current through the inductor L1. In PWM, a first comparator 331 senses the high voltage output from the boost converter (appearing across capacitor C1, referring to FIG. 1), and sets a status signal at a first resettable latch 320. A negative-voltage crossing (appearing across capacitor C2) sensed via the negative-voltage contact Vn and compared with a second comparator 332 determines when the first latch 320 is reset. An internal clock circuit, comprising a second latch 322, a clocked flip-flop 340, and a selectable off-period circuit 360 may receive a clock signal from central logic 310 of the switch control 180 and receive inputs from AND gates indicating the voltage status on the boost converter outputs and current level applied to the inductor L1. The internal clock may have a variable period or frequency. According to some embodiments, the central logic 310 may select a first off-period $T_1$ of the internal clock and drive output buffers 312, 314 (which drive gates of transistors M1, M2) using the first off-period $T_1$ until the sensed high-voltage reaches a first threshold value. Then the central logic 310 may select a second off-period T2 at which to alternatingly apply voltage across the inductor L1 until the current in the inductor reaches a first threshold value. Subsequently, the central logic 310 may select the first off-period $T_1$ for allowing current to dissipate from the inductor L1, and the cycle of applying and dissipating current from the inductor may be repeated using two different off-periods. Circuitry for sensing current in the inductor and comparing against threshold values may include current control circuitry 380 that outputs a reference voltage value to a third comparator 334. The third comparator may receive an input from a current limit contact (labeled "$I_s$" in the drawing) that couples to an end of the inductor L1.

Figure 4:
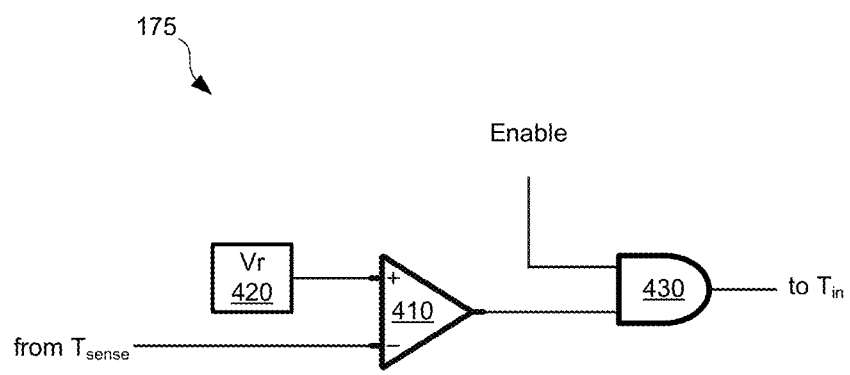
FIG. 4 depicts components of temperature-control circuitry, according to some embodiments.

FIG. 4 depicts one non-limiting example of temperature-control circuitry 175 that may be used to protect a multi-voltage converter 100 from over-heat conditions. According to some embodiments, the temperature-control circuitry may comprise a voltage comparator 410 that compares a signal from the temperature sensor 170 against a reference voltage provided by a voltage reference source 420. The voltage reference source may be any suitable source. In some implementations, the voltage reference source 420 may be included with reference circuits 160. According to some embodiments, a value of the voltage reference source may be programmed via register 150 or may be hardwired at manufacture.

The temperature-control circuitry may further include an AND logic gate 430 that receives an output from the comparator 410 and an enable signal. The enable signal may be applied to activate the temperature-control circuitry upon power up, for example. An output from the AND gate 430 may be provided to central logic 310 of the switch control circuit 180, in some embodiments. In some implementations, an output from the AND gate 430 may be provided to the TTL buffer 110.

In operation, the temperature-control circuitry 175 may continuously receive a signal from the temperature sensor 170 during operation of the multi-voltage converter 100. If a low signal from the temperature sensor indicates that the sensed temperature is within an acceptable range (e.g., lower than a reference voltage $V_r$ from voltage reference 420), then the comparator's output will be high, as will the output from AND gate 430. However, when the temperature-sensing signal exceeds a threshold value ($V_r$), then the output from the comparator 410 and an output from the AND gate 430 will both toggle low. In some implementations, central logic 310 may be configured to disable voltage conversion when it receives a low signal from the temperature-sense input $T_{in}$. Additionally or alternatively, the signal from $T_{in}$ may be provided to the TTL buffer 110, which may be configured to deactivate any applied bias when receiving a logic low signal from input $T_{in}$. In some embodiments, the levels of temperature-sensing and temperature-control signals may be reversed, but the effect will be to deactivate voltage conversion and/or applied biasing when an over-heat condition is sensed.

In some embodiments, a multi-voltage converter may be configured to reduce output voltages when an over-heat condition is sensed. This configuration may be used when biasing GaN amplifiers and/or PIN diodes, for example. In such embodiments, an output from the temperature-control circuit 175 may be provided to programmable register 150. When an over-heat condition is sensed, the signal received from the temperature-control circuit may cause the register to adjust a voltage of the HV LDO 120, for example, to a predetermined lower value. The resulting reduction in power being drawn by an amplifier and/or PIN diode may be sufficient to recover from an over-heat condition.

Methods for biasing RF components, such as PIN diodes and/or GaN devices, using the above-described multi-voltage converter may also be implemented. For example, a method for biasing radio-frequency components with a multi-voltage converter may comprise acts of receiving, at the multi-voltage converter, a supply voltage, and converting, with a boost converter assembled on a same substrate, the supply voltage to a second voltage that is positive and greater than the first voltage, and further converting, with the boost converter, the supply voltage to a negative voltage that is less than the first voltage. The act of converting may comprise switching two transistors to drive current through a single inductor. According to some embodiments, the switching may comprise a combination of pulse width modulation and pulse frequency modulation. The supply voltage may be the only supply voltage provided to the converter, and may be a low voltage (e.g., 5 volts). A method may further include acts of reducing, with a low-dropout regulator assembled on the substrate, the second voltage to a third voltage and providing the third voltage and/or the negative voltage to bias a radio-frequency component.

To avoid overheating the device, a method may further include acts of sensing a temperature of the multi-voltage converter with an integrated temperature sensor, determining an over-heat condition, and altering, with a temperature-control circuit, operation of the boost converter in response to determining the over-heat condition.

In some embodiments, an RF component that may be biased with the multi-voltage converter may comprise one or more GaN transistors (e.g., GaN HEMTs). For example, GaN transistors may be biased and used in RF amplifiers, such as Doherty amplifiers, for cellular communications. When biasing a GaN HEMT, for example, care must be taken to avoid biasing the drain of the device until the gate is biased with sufficient negative voltage so that damaging current flow will not occur. A biasing method may then include biasing at least one GaN transistor of an amplifier by applying a negative voltage $V_n$ from a gate contact $V_g$ of the multi-voltage converter to a gate of the GaN transistor, and subsequently applying a high voltage from the HV LDO to a drain of the transistor.

Figure 5:
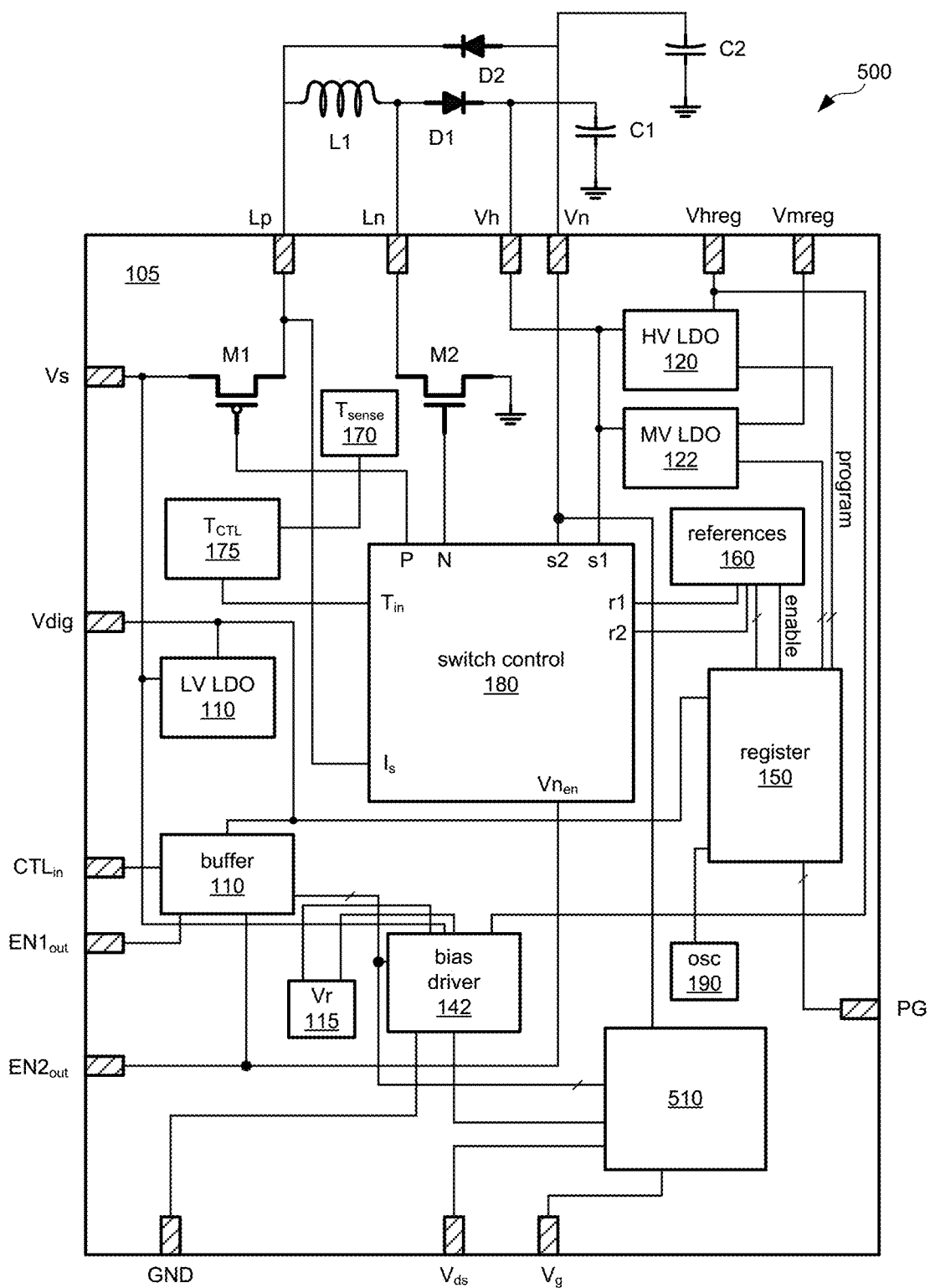
FIG. 5 depicts an integrated multi-voltage converter that includes integrated sequencing circuitry for biasing a gallium-nitride amplifier, according to some embodiments.

FIG. 5 depicts one example of a multi-voltage converter 500 that includes an integrated sequencing circuit and is configured to bias an external GaN amplifier (not shown). The GaN amplifier may comprise a Doherty amplifier that is used at a cellular base station for RF communications, for example. A positive voltage $Vh_{reg}$ may be generated from the high-voltage LDO 120 as described above and used to supply power to the GaN amplifier (e.g., to a drain of one or more GaN transistors in the amplifier). In some embodiments, the multi-voltage converter 500 may provide the positive voltage through its controlled bias driver 142 to a sequencing circuit 510. The positive voltage provided to the sequencing circuit may be between approximately 15 volts and approximately 32 volts, in some embodiments. Also, a negative voltage $V_n$ may be generated by the multi-voltage converter, as described above, and used to bias the GaN amplifier's gate prior to and during power-up of the amplifier. The negative voltage may also be provided to the sequencing circuit 510.

The sequencing circuit 510 may be used to control the biasing sequence of the positive voltage $Vh_{reg}$ and negative voltage $V_n$ when applied to and removed from an external GaN amplifier. For example, the sequencing circuit may control when the positive voltage $Vh_{reg}$ and the negative voltage $V_n$ are provided to a drain supply contact $V_{ds}$ and a gate bias contact $V_g$ located on the multi-voltage supply package. These contacts may connect to drain and gate biasing contacts on one or more GaN amplifiers. The sequencer may comprise logic circuits that assure that the positive voltage is not applied to the drain supply contact $V_{ds}$ when there is a DC voltage at the gate bias contact greater than a predetermined amount (e.g., greater than about −8 volts). In some implementations, the sequencing circuit 510 may further ensure that a negative voltage at the gate bias contact $V_g$ is not removed until the positive voltage at the drain supply contact $V_{ds}$ is below a threshold value.

In some implementations, an RF amplifier may be switched off during operation when not needed to conserve power. A control signal for powering down, and/or powering up the amplifier may be received by the multi-voltage converter 500 at a control contact $CTL_{in}$. Even though the amplifier may be switched on and off during operation by an external control signal, the sequencing circuit 510 can continue its operation normally to assure that the amplifier is powered up and/or powered down using a proper bias sequence.

Figure 6:
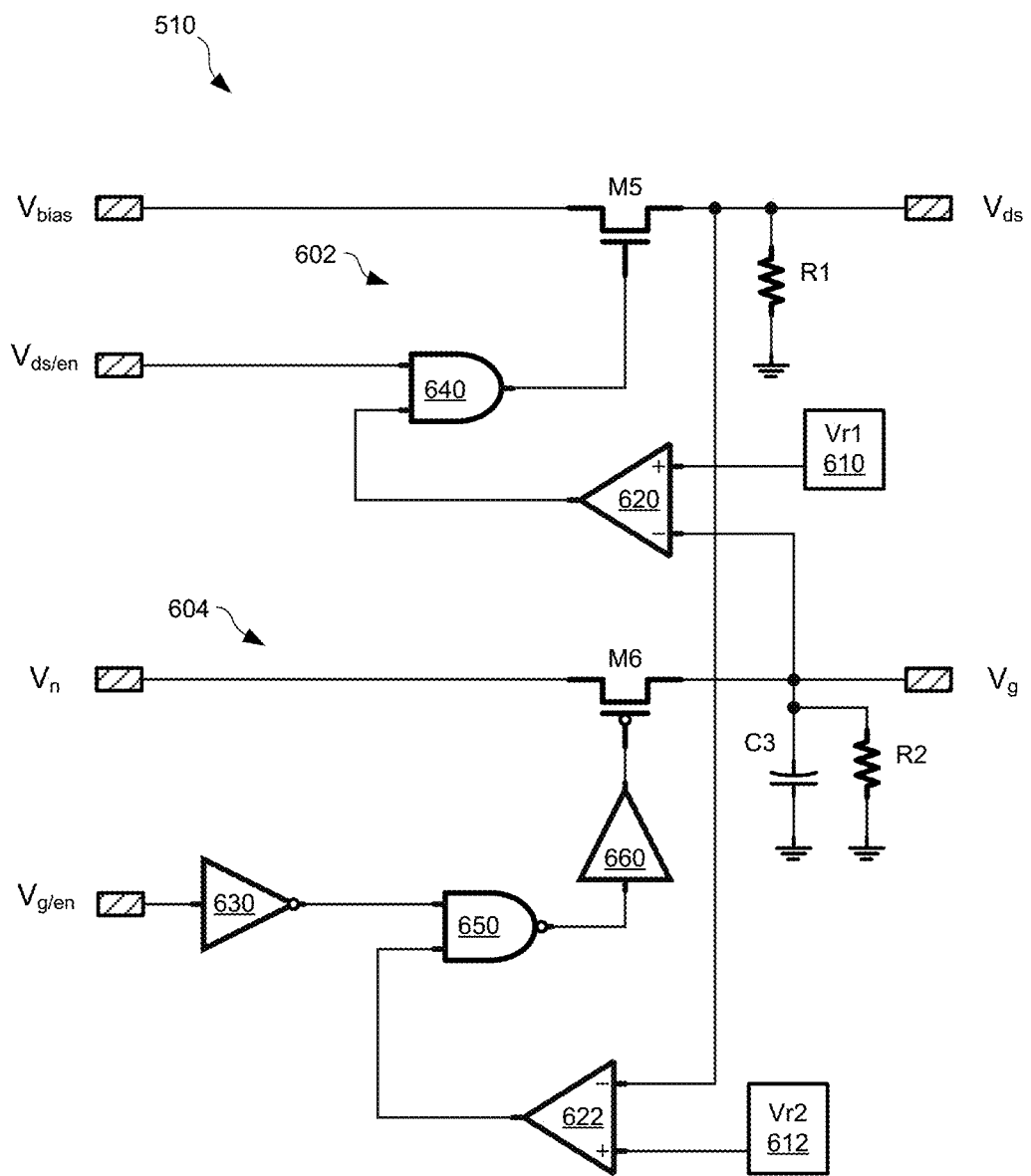
FIG. 6 depicts sequencing circuitry, according to some embodiments.

An embodiment of a sequencing circuit 510 is depicted in FIG. 6, although the invention is not limited to only the sequencing circuit shown. Other embodiments may include counters to delay switching times, latches, flip-flops, and/or additional logic elements. According to some embodiments, a sequencing circuit 510 may comprise a first logic circuit 602 configured to control the application of a positive voltage $Vh_{reg}$ to the drain supply contact $V_{ds}$, and a second logic circuit 604 configured to control the application of a negative voltage $V_n$ to the gate contact $V_g$. The sequencing circuit may be fully integrated within the same package and/or substrate that includes the components of the multi-voltage converter 500.

The first logic circuit 602 may comprise a first transistor M5, an AND gate 640, a comparator 620, a resistor R1, and a first reference voltage 610. The first logic circuit may be configured to assure that the first transistor may only be switched to a conducting state when a negative voltage is present at the gate contact $V_g$ that is less than a first reference voltage value $V_{r1}$. The first transistor M5 may be configured to switch voltage from a positive voltage bias contact $V_{bias}$ (which may connect to the bias driver 142) to the drain supply contact $V_{ds}$. The comparator 620 may sense the voltage at the gate contact $V_g$ and compare it against a reference voltage $V_{r1}$. The reference voltage may be −8 volts, for example, though other voltages may be used in other embodiments. The reference voltage value will be sufficient if it prevents conduction by the amplifier's transistors when the drain bias voltage is applied. If the negative voltage is less than the reference voltage, then the comparator may output a logic 1 to the AND gate 640. The AND gate may receive an enable signal (logic 1) from an enable contact $V_{ds/en}$ which may receive a digital signal from the buffer 110, referring to FIG. 5. When a command is received at the control contact $CTL_{in}$ to activate the amplifier, for example, an activating signal will only be applied to the gate of the first transistor M5 when a negative voltage less than $V_{r1}$ is sensed at the gate contact $V_g$. In some embodiments, a resistor R1 may be included to remove voltage from the drain supply contact and drain of a GaN amplifier when a command is received to deactivate the amplifier (e.g., transistor M5 switches off).

Referring again to FIG. 6, the second logic circuit 604 may comprise a second transistor M6, an inverter 630, a NAND gate 650, a level shifter 660, a comparator 622, a second voltage reference 612, a second resistor R2, and a capacitor C3. The second logic circuit may be configured to assure that voltage is not removed from the gate contact $V_g$ until the voltage at the drain supply contact $V_{ds}$ is below a second reference voltage $V_{r2}$. The second transistor may be configured to switch voltage from a negative voltage contact $V_n$ to the gate contact $V_g$. A second comparator 622 may sense the voltage on the drain supply contact $V_{ds}$ and compare it to a reference voltage $V_{r2}$ which may have a low voltage value (e.g., 0.1 volt, though other values may be used). When the voltage at the drain supply contact $V_{ds}$ falls below the reference voltage $V_{r2}$, the comparator 622 may output a logic 1 value to the NAND gate 650. If a disable signal (logic 0) is received from the gate control contact $V_{g/en}$, which may receive a digital signal from buffer 110, the signal is inverted by inverter 630 and received as a logic 1 at the NAND gate. Accordingly, the gate of the second transistor M6 will only be driven to switch off the transistor, and remove negative voltage from the gate contact $V_g$, when a gate disable signal is received and the voltage at the drain supply contact $V_{ds}$ has fallen below threshold value. For all other cases, a negative voltage may be applied to the gate contact. A second resistor R2 and capacitor C3 may connect to the gate contact $V_g$ to remove voltage from the gate contact and amplifier when transistor M6 opens. The capacitor may be included to assure that charge drains from the gate contact $V_g$ significantly more slowly than from the drain supply contact $V_{ds}$ in the event of an abrupt power failure for the device.

Although FIG. 5 depicts a multi-voltage converter with both temperature-protection circuitry and bias-sequencing circuitry, some embodiments may not include the temperature-protection circuitry. In some implementations, the reference voltages 610, 612 may be externally programmable via register 150.

CONCLUSION

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The technology described herein may be embodied as a method, of which at least some acts have been described. The acts performed as part of the method may be ordered in any suitable way. Accordingly, embodiments may be constructed in which acts are performed in an order different than described, which may include performing some acts simultaneously, even though described as sequential acts in illustrative embodiments. Additionally, a method may include more acts than those described, in some embodiments, and fewer acts than those described in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A voltage converter comprising:
   a substrate on which the voltage converter is assembled;
   a supply voltage contact configured to receive electrical power from a power source having a positive voltage;
   a boost converter connected to the supply voltage contact and configured to convert a supply voltage received from the power source to a first voltage that is greater than the supply voltage and to a negative voltage;
   a low-dropout regulator configured to convert the first voltage to a second voltage that is less than the first voltage;
   a register configured to output a first control signal that sets at least the second voltage within a positive voltage range that is greater than zero volts; and
   a sequencing circuit assembled on the substrate and configured to apply the second voltage to a drain supply contact only when the negative voltage is provided to a gate contact.

2. The voltage converter of claim 1, wherein the supply voltage contact is the only contact for receiving power that powers the voltage converter.

3. The voltage converter of claim 1, wherein the supply voltage is between approximately 2.5 volts and approximately 7 volts.

4. The voltage converter of claim 1, further comprising temperature sensing and control circuitry configured to sense an over-heat condition of the voltage converter.

5. The voltage converter of claim 4, wherein the temperature sensing and control circuitry comprises a temperature sensor located near switching transistors of the boost converter.

6. The voltage converter of claim 5, wherein the temperature sensing and control circuitry comprises a comparator and at least one logic gate and is configured to receive a signal from the temperature sensor and output a control signal that alters operation of the boost converter when an over-heat condition is sensed.

7. The voltage converter of claim 6, wherein the control signal causes termination of voltage conversion by the boost converter when an over-heat condition is sensed.

8. The voltage converter of claim 6, wherein the control signal causes a reduction of a value of a converted output voltage from the voltage converter when an over-heat condition is sensed.

9. The voltage converter of claim 1, wherein the sequencing circuit comprises:
   a first logic circuit that senses a voltage at the gate contact and controls application of the second voltage to the drain supply contact; and
   a second logic circuit that senses a voltage at the drain supply contact and controls application of the negative voltage to the gate contact.

10. The voltage converter of claim 1, wherein the boost converter is configured to output up to 80 mA for the second voltage and/or the negative voltage.

11. The voltage converter of claim 1, further comprising a bias driver configured to receive a bias voltage from the low-dropout regulator and switch an output bias voltage between two levels.

12. The voltage converter of claim 1 arranged in a circuit to apply the second voltage and the negative voltage to a radio-frequency component.

13. The voltage converter of claim 12, wherein the radio-frequency component comprises a gallium-nitride transistor.

14. The voltage converter of claim 1, wherein the negative voltage has a value in a range from approximately −8 volts to approximately −20 volts.

15. The voltage converter of claim 1, wherein the first voltage has a value in a range from approximately 20 volts to approximately 35 volts.

16. The voltage converter of claim 1, wherein the boost converter comprises:
   two transistors;
   two inductor contacts on the substrate that are connected to the two transistors;
   and switching circuitry configured to switch current through an inductor that attaches to the two inductor contacts.

* * * * *